United States Patent [19]
Fleming

[11] Patent Number: 5,816,338
[45] Date of Patent: Oct. 6, 1998

[54] COMBINED FURROWING AND TAMPING TOOL

[76] Inventor: Damon S. Fleming, 261 White Oak Landing Rd., Winnsboro, La. 71295

[21] Appl. No.: 766,294

[22] Filed: Dec. 13, 1996

[51] Int. Cl.[6] ............................... A01B 1/10; A01B 1/20
[52] U.S. Cl. ............................ 172/381; 172/371
[58] Field of Search ..................... 172/381, 371

[56] References Cited

U.S. PATENT DOCUMENTS

| | | | |
|---|---|---|---|
| 1,739,489 | 12/1929 | Wagner | 172/381 |
| 1,946,006 | 2/1934 | Struckmeyer | 172/381 X |
| 2,291,144 | 7/1942 | Brownsey | 172/381 X |
| 2,928,483 | 3/1960 | Trost | 172/381 X |
| 3,915,240 | 10/1975 | Pittman | 172/381 X |
| 3,930,544 | 1/1976 | Foster, Sr. | 172/381 X |
| 3,965,990 | 6/1976 | Pittman | 172/381 X |
| 4,359,104 | 11/1982 | Haapala | 172/381 X |
| 4,546,831 | 10/1985 | Albertson | 172/318 X |
| 4,865,133 | 9/1989 | Dawley et al. | 172/381 X |
| 4,892,156 | 1/1990 | Willis | 172/381 |

*Primary Examiner*—Terry Lee Melius
*Assistant Examiner*—Christopher J. Novosad
*Attorney, Agent, or Firm*—Arnold S. Weintraub

[57] ABSTRACT

A combined furrowing and tamping garden tool includes an elongated handle having a ground engaging member disposed at one end thereof. The ground engaging member has a furrow forming member and a soil replacing and tamping element formed therewith as a unitary member. The furrow forming member depends from a first edge of the ground engaging member and the replacing and tamping portion is in diametric opposition to the furrow forming member such that the handle can be rotated 180° in either direction for the desired function.

4 Claims, 1 Drawing Sheet

COMBINED FURROWING AND TAMPING TOOL

BACKGROUND OF THE INVENTION

1. Field of the Invention

The present invention relates to gardening tools. More particularly, the present invention pertains to hand-held gardening tools. Even more particularly, the invention relates to a combined furrowing and tamping hand-held gardening tool.

2. Prior Art

As is known to those skilled in the art to which the present invention pertains, in planting gardens, especially with seeds, it is essential that furrows be formed in the soil. Then, after the seeds are sown or placed in the furrow, the soil which has been removed from the ground, in order to form the furrow, must be replaced and packed back over the seeds and then tamped down into place. Such process requires the formation of the furrow and, thereafter, the replacement of the soil. This can be a time consuming and laborious manual job. While there are tools specifically designed for forming the furrows, usually, a shovel, spade or similar device, must thereafter be obtained to put the soil back over the furrow. More often than not, the tamping of the soil is achieved through the back of the spade or by merely by stepping on the ground.

However, it is to be appreciated, that in order to achieve this process at least two separate gardening tools must be employed, i.e., the furrowing device and at least a shovel or a spade.

Heretofore, and to the best of Applicant's knowledge there has yet to be devised a combined tool which enables both furrowing and replacement and tamping of the soil after the seeds are emplaced.

As will subsequently be detailed, the present invention provides such a unitary tool.

SUMMARY OF THE INVENTION

In accordance with the present invention there is provided a combined furrowing and tamping gardening tool which, generally, comprises:

(a) means for grasping the tool, and
(b) a ground engaging member secured to the means for grasping, the ground engaging member having a first portion defining means for forming a furrow and a second portion defining means for replacing and tamping soil in a furrow.

Preferably, the first and second portions or ends are in opposed relation. Furthermore, preferably, the ground engaging member is formed as an unitary member such that in a first position the means for furrowing engages the ground and by rotating the means for grasping 180° the tamping side is deployed for ground engagement.

For a more complete understanding of the present invention reference is made to the following detailed description and accompanying drawing. In the drawing like reference characters refer to like parts throughout the several views in which:

DESCRIPTION OF THE PREFERRED EMBODIMENT

Figure 1:
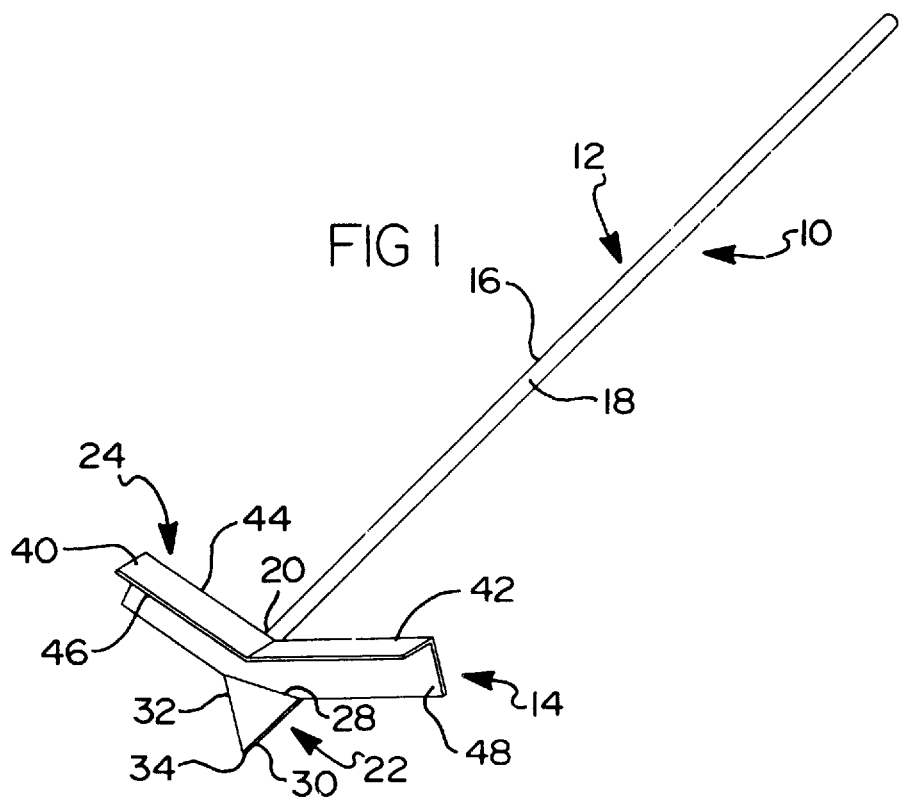
FIG. 1 is a perspective view of the gardening tool of the present invention.
Figures 2, 3:
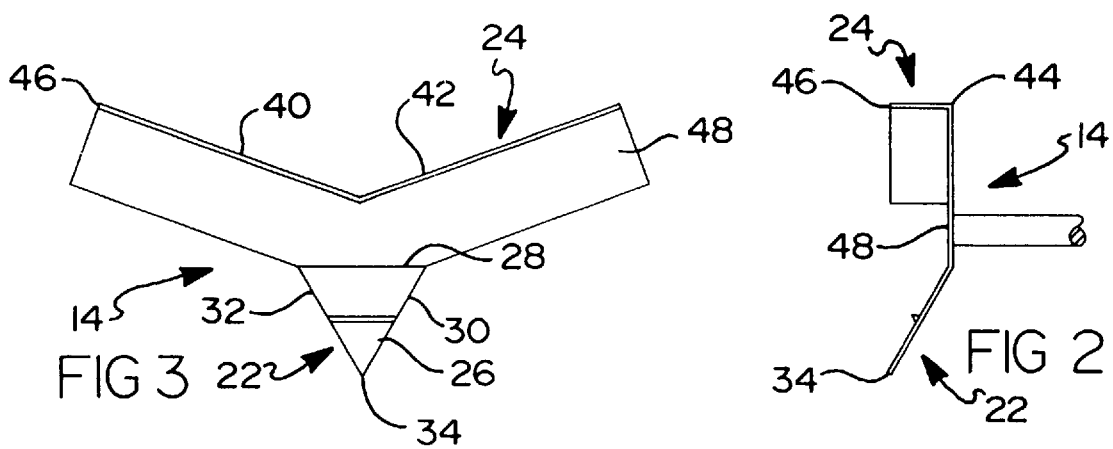
FIG. 2 is a broken, side elevational view thereof in a first position.
FIG. 3 is an end elevational view thereof.

Now, and with reference to the drawing, there is depicted therein a gardening tool in accordance with the present invention and, generally, denoted at 10. The gardening tool 10 hereof, as heretofore noted, is a combined furrowing and tamping device which, includes or comprises means for grasping, generally, denoted at 12 and a ground engaging member 14 connected to or otherwise secured to the means for grasping 12.

The means for grasping, preferably, comprises a handle 16, such as an elongated tubular or cylindrical member 18 of well-known construction. Typically, such handles are formed from wood, plastic or other similar material and has a length sufficient to enable the user to stand in a slightly bent over or other erect position, while employing the device without placing or exerting too much strain on the back of the user.

The handle 18 has a first end 20 which may be threaded to enable the removable mounting of the handle 18 to the ground engaging member via a complementary threaded connected affixed thereto (not shown).

Alternatively, the ground engaging member may be fixed to the handle via a fastener, by being crimped thereonto by being welded, or otherwise permanently secured thereto. Likewise, depending on the material of construction the means for grasping and the ground engaging member may be integrally formed as a unitary member when formed of a suitable material, such as a plastic or the like.

The ground engaging member 14 includes means for forming a furrow, generally, denoted at 22 and means for replacing and tamping soil into a furrow, generally, denoted at 24. The means for forming the furrow or furrow forming member 22 comprises a substantially triangular plate or element 26 having a base edge 28 and inwardly converging side edges 30 and 32 which converge at an apex 34. The apex or point 34 defines a ground penetrating member which cooperates with the side edges to cause the soil to be removed from the furrow as it is formed and to be piled on opposed lateral sides thereof.

The point 34 member penetrates the soil and is dragged therethrough to form the furrow while the lateral sides cooperate to remove the soil therefrom as the burrow is being formed.

Figure 4:
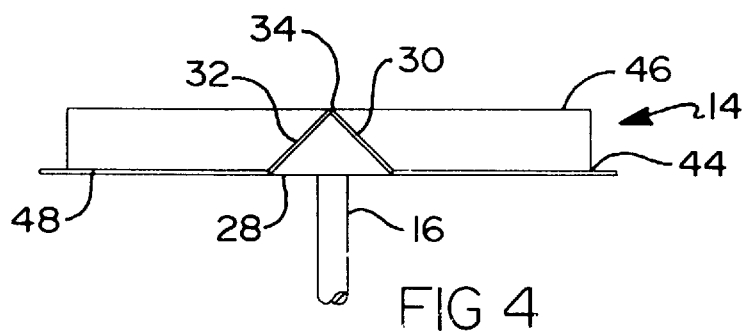
FIG. 4 is a broken top plan view of the device hereof.

The means for replacing and tamping the soil, generally, comprises a pair of angularly inclined opposed sections 40 and 42. The sections 40 and 42 are angularly inclined with respect to each other and cooperate to form a V-shaped member having a first edge 44 and a second or rear edge 46. By angularly inclining the segments with respect to each other they envelop and overlie the dirt disposed at the edges of the furrow when deposited thereat by the forming member. As shown, the furrow forming member downwardly depends from the means for replacing at the front edge 44. A flange 48 downwardly depends from the edge 44, as shown. When the flange 48 is oriented in the manner shown in FIG. 4, and dragged along the side of the furrow envelop and draw the soil back into the furrow while contemporaneously tamping it into place. Generally, the segments are angularly inclined with respect to each other at an angle ranging from about 5° to about 45°.

In a particularly preferred embodiment hereof, and as shown in the drawing, the ground engaging member 14 the flange defines a main body portion to which is secured the first end 24 of the handle 18.

The means for forming a furrow is integral with the main body section and projects downwardly therefrom, as shown.

In use the furrow forming member is rendered into engagement with the ground and by pulling it toward the user a furrow is formed. Then, after the furrow is formed and seed is emplaced within the furrow, the soil which is removed is replaced in the furrow and tamped into place by rotating the ground engaging member 180° from the furrowing side to thereby expose the means for tamping to the ground. Thus, by emplacing the ground engaging member over the sides of the furrow, the soil which has been removed is, then, replaced into the ground by pulling the tool towards the user. This causes the removed soil to be replaced into the furrow and, thus, covering the seeds.

The ground engaging member can be formed as a separate element which is then affixed to the means for grasping, alternatively, or the handle and the ground engaging member can be formed as a unitary member for any suitable material such as plastic or the like.

It is to be appreciated that this combined furrowing and tamping device facilitates the forming of the furrows and the replacement of the soil back into the ground.

Having, thus, described the invention what is claimed is:

1. A gardening tool comprising:
   (a) means for grasping;
   (b) a ground engaging member, the ground engaging member including
      (1) means for forming a furrow,
      (2) means for replacing and tamping soil back into a furrow, the ground engaging member further including a flange having a first edge and a second edge, the means for forming a furrow projecting from and integrally formed with the first edge, a pair of opposed continuous sections extending from the second edge, the opposed continuos sections being angularly inclined with respect to each other and sharing a common edge, the common edge being normal to the second edge of the flange, the sections cooperating to form a V-shaped member, the V-shaped member defining the means for replacing and tamping soil back into a furrow.

2. The tool of claim 1 wherein the means for grasping comprises an elongate cylindrical handle.

3. The tool of claim 2 which further comprises means formed in the flange for receiving one end of the handle.

4. The tool of claim 1 wherein the means for forming a furrowing comprises:
   (a) a substantially triangular element having a pair of converging side edges, the converging side edges terminating at an apex, the apex defining an earth penetrating element.

* * * * *